United States Patent
Yasunaga et al.

(10) Patent No.: US 9,586,478 B2
(45) Date of Patent: Mar. 7, 2017

(54) ENGINE ROTATIONAL SPEED DISPLAY DEVICE

(71) Applicant: Fuji Jukogyo Kabushiki Kaisha, Tokyo (JP)

(72) Inventors: Shinya Yasunaga, Tokyo (JP); Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 14/572,542

(22) Filed: Dec. 16, 2014

(65) Prior Publication Data
US 2015/0175004 A1 Jun. 25, 2015

(30) Foreign Application Priority Data
Dec. 24, 2013 (JP) .................................. 2013-265826

(51) Int. Cl.
*B60Q 1/00* (2006.01)
*B60K 35/00* (2006.01)
*B60K 37/06* (2006.01)

(52) U.S. Cl.
CPC .............. *B60K 35/00* (2013.01); *B60K 37/06* (2013.01); *B60K 2350/1064* (2013.01); *B60K 2350/352* (2013.01)

(58) Field of Classification Search
CPC ...... B60K 2350/1064; B60K 2350/352; B60K 35/00; B60K 37/06
See application file for complete search history.

(56) References Cited

U.S. PATENT DOCUMENTS

| 2014/0149008 A1* | 5/2014 | Shibata | ................... | F16H 63/42 |
| | | | | 701/58 |
| 2016/0138468 A1* | 5/2016 | Shibata | ................... | G01D 7/00 |
| | | | | 701/110 |

FOREIGN PATENT DOCUMENTS

| JP | 01-154195 A | 6/1989 | | |
| JP | 2009-220678 A | 10/2009 | | |
| JP | 2009220678 A | * 10/2009 | | |
| JP | 2013-245729 A | 12/2013 | | |
| JP | WO 2015005401 A1 | * 1/2015 | ................ | G01P 1/07 |

OTHER PUBLICATIONS

Japanese Decision of Rejection dated May 10, 2016 with an English translation thereof.

* cited by examiner

*Primary Examiner* — Omeed Alizada
(74) *Attorney, Agent, or Firm* — McGinn IP Law Group, PLLC.

(57) ABSTRACT

An engine rotational speed display device includes: an engagement state determination module that determines an engagement state of a lock-up clutch; a target rotational speed setting module that sets a target turbine rotational speed according to a selected gear stage; a rotational speed for display selection unit that selects an engine rotational speed as a rotational speed for display when the lock-up clutch is not engaged and selects the target turbine rotational speed as the rotational speed for display when the lock-up clutch is engaged; a time measuring module that measures an elapsed time since a gear shift operation is received; and a rotational speed for display limiting module that limits a variation in the rotational speed for display per unit of time according to the elapsed time when the target turbine rotational speed is selected as the rotational speed for display.

14 Claims, 4 Drawing Sheets

ENGINE ROTATIONAL SPEED DISPLAY DEVICE

CROSS-REFERENCE TO RELATED APPLICATIONS

The present application claims priority from Japanese Patent Application No. 2013-265826 filed on Dec. 24, 2013, the entire contents of which are hereby incorporated by reference.

BACKGROUND

1. Technical Field

The present disclosure relates to an engine rotational speed display device, and particularly to an engine rotational speed display device of a vehicle equipped with a continuously variable transmission having manual transmission mode in which the transmission is shifted according to a gear shift operation of a driver.

2. Related Art

The characteristics such as the output (horsepower, torque) and fuel consumption amount of an engine significantly vary with the rotational speed of the engine. Thus, a conventional vehicle is generally equipped with a display device (tachometer) for informing a driver of the engine rotational speed. Such an engine rotational speed display device has various known types including mechanical type, electrical type, and digital type. For example, an engine rotational speed is calculated from time variation in rotational position of a crankshaft, the rotational position being obtained from output signals of a crank angle sensor, and for example, an electric motor is driven according to a result of the calculation so as to actuate a meter (needle).

For example, Japanese Unexamined Patent Application Publication No. H01-154195 discloses such an engine rotational speed display device, in which a counter setting value is defined to be large (determination period is set to be long) at the time of low rotation that is close to the idling engine speed, and the counter setting value is defined to be small (determination period is set to be short) at the time of middle to high rotation. The determination period is controlled to be reduced according to an increase in engine rotational speed, thereby implementing the technology that prevents a variation in rotational speed display due to varying engine rotational speed at the time of low rotation and ensures responsiveness for quick change in engine rotational speed at the time of high rotation.

In recent years, some vehicles have become commercially practical, in which the output characteristic of the engine and the transmission characteristics and the transmission mode of a continuously variable transmission (or an automatic transmission) are selectable (switchable) according to the preference of a driver. More specifically, the vehicles have become commercially practical, in which the output characteristic of the engine may be freely selected by choosing, for example, one of three modes, that is, normal mode, save mode, and power mode, the normal mode being suitable for normal driving, the save mode achieving low fuel consumption by reducing the output torque, the power mode being focused on power drive and achieving output characteristics having an excellent response in a rotational speed range including a low rotational speed range and a high rotational speed range. In addition, the transmission mode of the continuously variable transmission is selectively switchable between automatic transmission mode and manual transmission mode, the automatic transmission mode allowing a transmission ratio to be changed automatically according to a running state of the vehicle, the manual transmission mode allowing a transmission ratio to be changed according to a gear shift operation (manual operation) of a driver.

For example, when manual transmission mode is selected and a gear shift operation of a driver is received in such a vehicle, a response delay normally occurs before the gear shift operation of the transmission is actually started and the engine rotational speed changes accordingly. For this reason, if detected engine rotational speed is displayed as it is, the needle indicating the engine rotational speed starts to move with a slight delay after the gear shift operation of the driver.

On the other hand, for example when power mode, which allows more sporty running, is selected as the engine output characteristic, movement of the needle indicating the engine rotational speed is demanded to have a good response and give sporty impression to the driver. However, it is expected that increased deviation between the movement (change) of the needle indicating the engine rotational speed and the actual movement (change) of the engine rotational speed may give sense of incongruity to the driver.

SUMMARY OF THE INVENTION

The present disclosure has been made in order to solve the above-mentioned problem and provides an engine rotational speed display device of a vehicle equipped with a continuously variable transmission having manual transmission mode in which the transmission is shifted according to a gear shift operation of a driver, the engine rotational speed display device being capable of giving more sporty impression to a driver without giving sense of incongruity.

An aspect of the present disclosure provides and engine rotational speed display device for a vehicle equipped with a continuously variable transmission that has a manual transmission mode allowing a gear shift according to a gear shift operation of a driver and that converts and outputs a drive force that is outputted from an engine and transmitted via a torque converter with a lock-up clutch. The engine rotational speed display device includes: an engagement state determination module that determines an engagement state of the lock-up clutch; an engine rotational speed acquisition module that acquires a rotational speed of the engine; a target rotational speed setting module that sets a target turbine rotational speed of a turbine liner included in the torque converter according to a selected gear stage; a rotational speed for display selection module that selects the engine rotational speed as a rotational speed for display when the lock-up clutch is not engaged and selects the target turbine rotational speed as the rotational speed for display when the lock-up clutch is engaged; and a display unit that displays a rotational speed according to the rotational speed for display.

The engine rotational speed display device may include a limiting module that limits a variation in the rotational speed for display when the target turbine rotational speed is selected as the rotational speed for display by the rotational speed for display selection module. The display unit may display a rotational speed according to the rotational speed for display for which the variation is limited by the limiting module.

The engine rotational speed display device may further include: an operation unit that receives a gear shift operation by a driver in the manual transmission mode; and a time measuring module that measures an elapsed time since the gear shift operation is received by the operation unit. The limiting module may limit a variation in the rotational speed for display per unit of time according to the elapsed time measured by the time measuring module.

The limiting module may limit the rotational speed for display so that the variation in the rotational speed for display per unit of time falls within a first variation limiting value until the elapsed time exceeds a predetermined time, and the limiting module may limit the rotational speed for display so that the variation in the rotational speed for display per unit of time falls within a second variation limiting value after the elapsed time exceeds the predetermined time. The first variation limiting value may be set to be smaller than the second variation limiting value.

The predetermined time may be variably set based on the gear stage selected by the gear shift operation and/or the engine rotational speed.

The first variation limiting value and the second variation limiting value may be each variably set based on the gear stage selected by the gear shift operation and/or the engine rotational speed.

DETAILED DESCRIPTION

Figure 1:
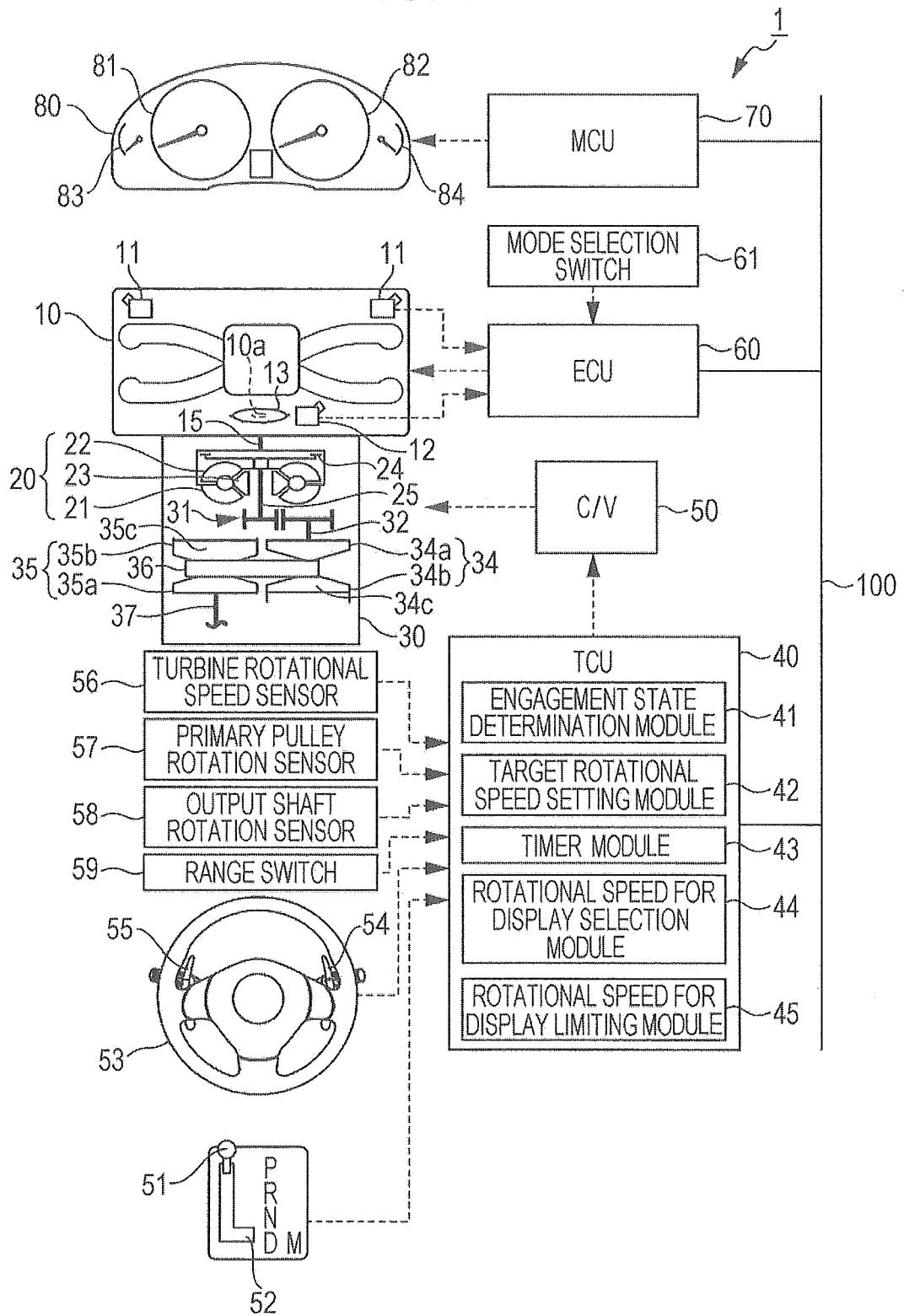
FIG. 1 is a block diagram illustrating a configuration of an engine rotational speed display device according to an implementation.

Hereinafter, a preferred implementation of the present disclosure will be described in detail with reference to the accompanying drawings. It is to be noted that the same or corresponding components are denoted by the same symbols in the drawings. Also, in each of the drawings, the same elements are denoted by the same symbols and redundant description will be omitted.

First, the configuration of an engine rotational speed display device 1 according to the implementation will be described with reference to FIG. 1. FIG. 1 is a block diagram illustrating the configuration of the engine rotational speed display device 1 according to the implementation. Here, the case will be described as an example where the engine rotational speed display device 1 is applied to a vehicle such that the output characteristic of an engine 10 and the gear shift characteristics/gear shift mode (automatic transmission mode and manual transmission mode) of a continuously variable transmission 30 are switchable by an operation of a driver.

The engine 10 may be of any type and is, for example, a horizontally-opposed 4-cylinder gasoline engine. The engine 10 is designed to be switchable between three modes (three stages) of output characteristics. More specifically, the engine 10 is designed such that the output torque varies substantially directly with depressed amount of an accelerator pedal (accelerator opening) and drive mode is switchable between normal mode, save mode, and power mode by a mode selection switch 61 disposed in, for example, the center console, the normal mode being suitable for normal driving, the save mode achieving easy driving performance and low fuel consumption performance by reducing the output torque, the power mode being focused on power drive and achieving output characteristics having an excellent response in a rotational speed range including a low rotational speed range and a high rotational speed range.

A cam angle sensor 11 for identifying the cylinders of the engine 10 is mounted in the vicinity of the camshaft of the engine 10. In addition, a crank angle sensor 12 for detecting a rotational position of a crankshaft 10a is mounted in the vicinity of the crankshaft 10a of the engine 10. Here, a timing rotor 13 is mounted to the end of the crankshaft 10a, the timing rotor having protrusions of 34 teeth with 10° pitches with, for example, two teeth lost. The crank angle sensor 12 detects a rotational position of the crankshaft 10a by sensing a protrusion of the timing rotor 13. A magnetic pickup sensor is preferably used as the cam angle sensor 11 and the crank angle sensor 12. It is to be noted that the cam angle sensor 11 and the crank angle sensor 12 are connected to the below-described engine control unit (hereinafter referred to as an "ECU") 60.

The continuously variable transmission 30 is connected to an output shaft 15 of the engine 10 via a torque converter 20 having a clutch function and a torque amplification function, the continuously variable transmission for converting and outputting a drive force from the engine 10.

The torque converter 20 mainly includes a pump impeller 21, a turbine liner 22, and a stator 23. The pump impeller 21 connected to the output shaft 15 generates a flow of oil, and the turbine liner 22, which is disposed to face the pump impeller 21, receives force from the engine 10 via oil to drive an output shaft. The stator 23 located between the pump impeller 21 and the turbine liner 22 rectifies the discharge flow (return) from the turbine liner 22 and returns it to the pump impeller 21, thereby generating a torque amplifying effect.

The torque converter 20 has a lock-up clutch 24 that allows the input and output to be in a directly connected state. When the lock-up clutch 24 is not engaged (in a non-lock-up state), the torque converter 20 increases the torque of the drive force from the engine 10 and transmits the increased torque to the continuously variable transmission 30, whereas when the lock-up clutch 24 is engaged (in a lock-up state), the torque converter 20 directly transmits the drive force from the engine 10 to the continuously variable transmission 30. The rotational speed (turbine rotational speed) of the turbine liner 22 included in the torque converter 20 is detected by a turbine rotational speed sensor 56. The detected turbine rotational speed is outputted to the below-described transmission control unit (hereinafter referred to as a "TCU") 40. For example, a magnetic pickup sensor is preferably used as the turbine rotational speed sensor 56.

The continuously variable transmission 30 is selectively switchable between a plurality of gear shift modes including automatic transmission mode and manual transmission mode, the automatic transmission mode allowing a transmission ratio to be changed automatically and continuously according to a running state of a vehicle, the manual transmission mode allowing a transmission ratio to be changed according to a gear shift operation of a driver. The details will be described later.

The continuously variable transmission 30 has a primary shaft 32 and a secondary shaft 37 disposed parallel to the primary shaft 32, the primary shaft being connected to an output shaft 25 of the torque converter 20 via a reduction gear 31.

The primary shaft 32 is provided with a primary pulley 34. The primary pulley 34 has a fixed pulley 34a connected to the primary shaft 32, and a movable pulley 34b that faces the fixed pulley 34a and is attached slidably in the axial direction of the primary shaft 32. Each of the pulleys 34a and 34b is designed to have a variable cone surface pitch, that is, a variable pulley groove width. On the other hand, the secondary shaft 37 is provided with a secondary pulley 35. The secondary pulley 35 has a fixed pulley 35a connected to the secondary shaft 37, and a movable pulley 35b that faces the fixed pulley 35a and is attached slidably in the axial direction of the secondary shaft 37. The secondary pulley 35 is designed to have a variable pulley groove width.

A chain 36 for transmitting drive force is suspended between the primary pulley 34 and the secondary pulleys 35. The groove width of each of the primary pulley 34 and the secondary pulley 35 is changed so that a ratio (pulley ratio) of a winding radius of the chain 36 to each pulley 34, 35 is changed, thereby changing the transmission ratio continuously. Here, the transmission ratio i is expressed by i=Rs/Rp, where Rp is the winding radius of the chain 36 to the primary pulley 34 and Rs is the winding radius of the chain 36 to the secondary pulley 35.

The primary pulley 34 (movable pulley 34b) includes a hydraulic chamber 34c. On the other hand, the secondary pulley 35 (movable pulley 35b) includes a hydraulic chamber 35c. The groove width of each of the primary pulley 34 and the secondary pulley 35 is set and changed by adjusting a primary hydraulic pressure and a secondary hydraulic pressure, the primary hydraulic pressure being introduced into the hydraulic chamber 34c of the primary pulley 34, the secondary hydraulic pressure being introduced into the hydraulic chamber 35c of the secondary pulley 35.

The hydraulic pressure for shifting the continuously variable transmission 30, that is, the above-described primary hydraulic pressure and secondary hydraulic pressure are controlled by a valve body (control valve) 50. The valve body 50 uses a spool valve and a solenoid valve (electromagnetic valve) for actuating the spool valve to open and close an oil passage that is formed in the valve body 50, thereby adjusting the hydraulic pressure discharged from an oil pump and supplying the adjusted hydraulic pressure to the hydraulic pressure chamber 34c of the primary pulley 34 and the hydraulic pressure chamber 35c of the secondary pulley 35. In addition, the valve body 50 supplies a hydraulic pressure, for example, to a forward/reverse switching mechanism for switching between forwarding and reversing the vehicle.

The floor (center console) of the vehicle is provided with a shift lever (select lever) 51 to receive an operation by a driver for selectively switching between automatic transmission mode ("D" range) and manual transmission mode ("M" range). The shift lever 51 is provided with a range switch 59 that is connected thereto to operate in coordination with the shift lever 51 and that detects a selection position of the shift lever 51. The range switch 59 is connected to the TCU 40 and the detected selection position of the shift lever 51 is read into the TCU 40. It is to be noted that in addition to the "D" range and the "M" range, the shift lever 51 allows selectable switching between parking "P" range, reverse "R" range, and neutral "N" range.

In the shift lever 51, an M range switch 52 is incorporated that is turned on when the shift lever 51 is located on the M range side, that is, manual transmission mode is selected, and that is turned off when the shift lever 51 is located on the D range side, that is, automatic transmission mode is selected. The M range switch 52 is also connected to the TCU 40.

On the other hand, the rear side of a steering wheel 53 is provided with plus (+) paddle switch 54 and minus (−) paddle switch 55 to receive a gear shift operation (gear shift request) by a driver in manual transmission mode (hereinafter, the plus paddle switch 54 and the minus paddle switch 55 may be collectively referred to as "paddle switches 54, 55"). The plus paddle switch 54 is used when transmission is up-shifted manually and the minus paddle switch 55 is used when transmission is down-shifted manually. That is, each of the plus paddle switch 54 and the minus paddle switch 55 functions as the operation unit described in the appended claims.

The plus paddle switch 54 and the minus paddle switch 55 are connected to the TCU 40, and a switch signal outputted from the paddle switches 54, 55 is read into the TCU 40. It is to be noted that the TCU 40 is also connected to a primary pulley rotation sensor 57 that detects a rotational speed of the primary pulley 34 and an output shaft rotation sensor (vehicle speed sensor) 58 that detects a rotational speed of the secondary shaft 37.

As described above, the continuously variable transmission 30 has two transmission modes, that is, automatic transmission mode and manual transmission mode that are selectively switchable therebetween by an operation of the shift lever 51. The automatic transmission mode is a mode that is selected by placing the shift lever 51 in the D range and in which the transmission ratio is automatically changed according to a running state of the vehicle. The manual transmission mode is a mode that is selected by placing the shift lever 51 in the M range and in which the transmission ratio is changed according to a gear shift operation (operation of the paddle switches 54, 55) by a driver.

More specifically, when the shift lever is placed in the D range with save mode or normal mode selected, normal automatic transmission control is performed, and when the shift lever is placed in the D range with power mode selected, 8-speed automatic transmission control with multiple-stage acceleration is performed. In addition, when the shift lever is placed in the M range with save mode or normal mode selected, 6-speed manual transmission control is performed, and when the shift lever is placed in the M range with power mode selected, 8-speed manual transmission control is performed.

The transmission control of the continuously variable transmission 30 is performed by the TCU 40. That is, the TCU 40 controls the drive of a solenoid valve (electromagnetic valve) included in the valve body 50 described above, thereby adjusting the hydraulic pressure supplied to the hydraulic pressure chamber 34c of the primary pulley 34 and the hydraulic pressure chamber 35c of the secondary pulley 35 and changing the transmission ratio.

The TCU 40 is communicably connected to the ECU 60 and a meter control unit (hereinafter referred to as an "MCU") 70, for example, via a controller area network (CAN) 100, the ECU 60 for comprehensively controlling the engine 10, the MCU 70 for comprehensively controlling a combination meter 80.

The TCU 40, ECU 60, and MCU 70 each include a microprocessor for performing calculation, a ROM for storing programs that cause the microprocessor to execute processing, a RAM for storing various data such as results of the calculation, a backup RAM for saving memory content with a 12V battery, and an input and output I/F.

The ECU 60 identifies each cylinder based on the output of the cam angle sensor 11, and determines an engine rotational speed from a change in rotational position of the crankshaft 10a, the rotational position being detected by the output of the crank angle sensor 12. That is, each of the crank angle sensor 12 and the ECU 60 functions as the engine rotational speed acquisition module described in the appended claims. The ECU 60 acquires various pieces of information such as a suction air amount, an accelerator pedal opening, an air-fuel ratio of air-fuel mixture, and water temperature based on detection signals inputted from various sensors. The ECU 60 then controls an amount of fuel injection, an ignition timing, and various devices based on these acquired various pieces of information, thereby controlling the engine 10 comprehensively.

In addition, the ECU 60 switches between, for example, a fuel injection amount map and an ignition timing map according to the position of the mode selection switch 61, thereby switching between three stages (normal mode, save mode, and power mode) of output characteristic of the engine. The ECU 60 transmits information to the TCU 40 via the CAN 100, the information including an engine rotational speed, an engine output characteristic mode (normal mode, safe mode, or power mode), and an accelerator pedal opening.

The MCU 70 controls the entire display of the combination meter 80 having a needle type tachometer (rotation meter) 81. The combination meter 80 has the tachometer 81 and a speedometer 82 that are disposed on the right and left at the center, the tachometer for indicating an engine rotational speed, the speedometer for indicating a vehicle speed. In addition, an engine water thermometer 83 for displaying an engine coolant temperature and a fuel gauge 84 for indicating a remaining amount of fuel are also disposed on both sides of the tachometer 81 and the speedometer 82. The TCU 40 transmits information to the MCU 70 via the CAN 100, the information including a rotational speed for display (the details will be described later). The MCU 70 decodes CAN data (information on rotational speed for display) received from the TCU 40, and drives an electric motor such as a stepping motor included in the tachometer 81 so as to form a needle angle (rotational speed display) corresponding to the rotational speed for display. Each of the MCU 70 and the combination meter 80 (tachometer 81) functions as the display unit described in the appended claims.

Figure 2:
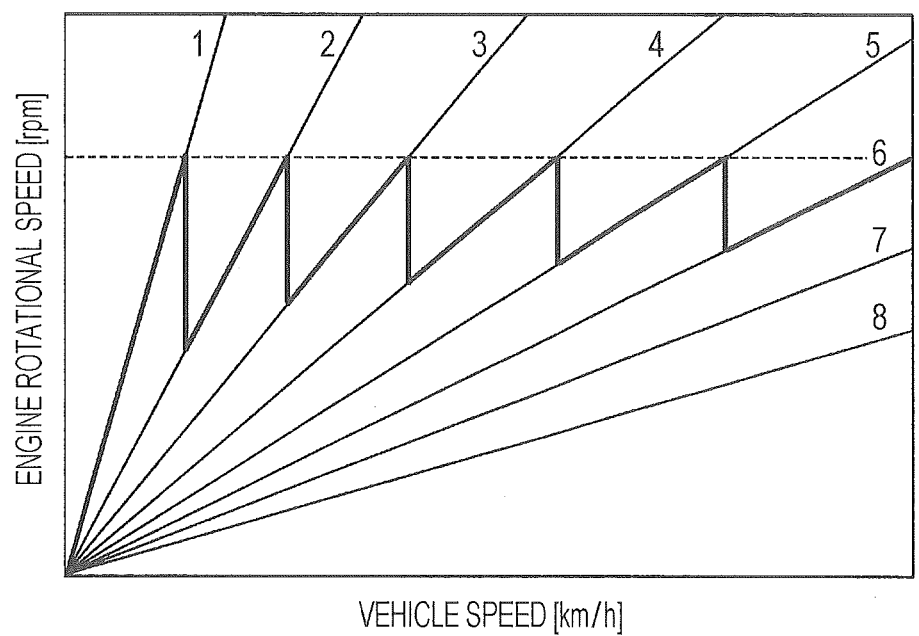
FIG. 2 is a graph illustrating the gear ratio setting in manual transmission mode of a continuously variable transmission according to the implementation.

When automatic transmission mode is selected, the TCU 40 continuously changes the transmission ratio automatically according to a running state (for example, an accelerator pedal opening and a vehicle speed) of the vehicle based on the transmission map. It is to be noted that a transmission map corresponding to automatic transmission mode is stored in the ROM in the TCU 40. FIG. 2 is a transmission characteristic diagram illustrating the relationship between engine rotational speed and vehicle speed. In FIG. 2, the horizontal axis indicates vehicle speed (km/h) and the vertical axis indicates engine rotational speed (rpm). Each of eight solid lines indicates the relationship (that is, transmission ratio characteristics in manual transmission mode) between engine rotational speed and vehicle speed when the transmission ratio is constant (in each gear stage). In automatic transmission mode, any transmission ratio between the first speed and the eighth speed illustrated in FIG. 2 is automatically set according to a running state of the vehicle.

When power mode and manual transmission mode are selected, the TCU 40 has a function of generating and outputting rotational speed for display information for displaying a rotational speed so as to give more sporty impression to a driver without giving sense of incongruity. Thus, the TCU 40 functionally has an engagement state determination module 41, a target rotational speed setting module 42, a timer module 43, a rotational speed for display selection module 44, and a rotational speed for display limiting module 45. In the TCU 40, programs stored in the ROM are executed by a microprocessor, thereby achieving each of the functions of the engagement state determination module 41, the target rotational speed setting module 42, the timer module 43, the rotational speed for display selection module 44, and the rotational speed for display limiting module 45.

The engagement state determination module 41 determines an engagement state of the lock-up clutch 24. That is, the engagement state determination module 41 functions as the engagement state determination module described in the appended claims. More specifically, the engagement state determination module 41 determines that the lock-up clutch 24 is engaged, for example, when the rotational difference between the engine rotational speed and the turbine rotational speed is approximately zero. An engagement state of the lock-up clutch 24 may be determined according to whether or not a control phase (or indicated value) of clutch hydraulic pressure reaches full engagement. It is to be noted that the determined engagement state (engagement or disengagement) of the lock-up clutch 24 is outputted to the rotational speed for display selection module 44.

When manual transmission mode is selected, the target rotational speed setting module 42 sets a target turbine rotational speed for the turbine liner 22 included in the torque converter 20 based on the transmission ratio that is set according to a selected gear stage. That is, the target rotational speed setting module 42 functions as the target rotational speed setting module described in the appended claims. The set target turbine rotational speed is outputted to the rotational speed for display selection module 44. It is to be noted that a target engine rotational speed may be used instead of a target turbine rotational speed. Also, a target primary pulley rotational speed may be used in consideration of the gear ratio of the reduction gear 31.

The timer module 43 has a timer that starts to measure time when an operation of the plus paddle switch 54 or the minus paddle switch 55 is performed. The timer module 43 measures an elapsed time since an operation (gear shift operation) of the plus paddle switch 54 or the minus paddle switch 55 is performed. That is, the timer module 43 functions as the time measuring module described in the appended claims. It is to be noted that an elapsed time since an operation of a gear shift is outputted to the rotational speed for display limiting module 45, the gear shift operation being measured in time by the timer module 43. It is to be noted that a counter that is counted up for every predetermined time may be used instead of a timer so that elapsed time since an operation of the plus paddle switch 54 or the minus paddle switch 55 may be measured.

Based on a result of the determination of the engagement state determination module 41, the rotational speed for display selection module 44 selects the engine rotational speed as the rotational speed for display when the lock-up clutch 24 is not engaged, or selects the target turbine rotational speed as the rotational speed for display when the lock-up clutch 24 is engaged. That is, the rotational speed for display selection module 44 functions as the rotational speed for display selection module described in the appended claims. It is to be noted that the selected rotational speed for display is outputted to the rotational speed for display limiting module 45.

The rotational speed for display limiting module 45 limits the variation (rpm) in rotational speed for display per unit of time (for example, 10 ms) according to an elapsed time since a gear shift operation is performed, the elapsed time being measured by the timer module 43. That is, the rotational speed for display limiting module 45 functions as the limiting module described in the appended claims. More specifically, the rotational speed for display limiting module 45 limits the change (increase or decrease) in rotational speed for display so that the variation in rotational speed for display per unit of time falls within a first variation limiting value until the above-mentioned elapsed time exceeds a predetermined time. The rotational speed for display limiting module 45 limits the change (increase or decrease) in rotational speed for display so that the variation in rotational speed for display per unit of time falls within a second variation limiting value after the above-mentioned elapsed time exceeds the predetermined time. Here, the first variation limiting value is set to be smaller than the second variation limiting value. Therefore, until the predetermined time elapses since a gear shift operation is performed, the rate of variation in rotational speed for display is lower than the rate of variation after an elapse of the predetermined time.

Here, the above-mentioned predetermined time is variably set based on the gear stage and engine rotational speed (rotational area) that are selected according to the gear stage and gear shift operation at the current time (at the time of gear shift operation). Similarly, the above-mentioned first variation limiting value and second variation limiting value are variably set based on the gear stage at the current time (at the time of gear shift operation), the selected gear stage, and the engine rotational speed (rotational area). That is, the rotational speed for display limiting module 45 sets each of the above-mentioned predetermined time, first variation limiting value, and second variation limiting value based on the gear stage and the engine rotational speed.

Here, the predetermined time may be determined by pre-storing, for example, a map (predetermined time map), which defines the relationship between gear stage, engine rotational speed, and predetermined time, and referring to the predetermined time map at the time of control using the gear stage and the engine rotational speed in real time. Similarly, the first variation limiting value and the second variation limiting value may be determined by pre-storing, for example, maps (a first variation limiting value map, a second variation limiting value map) that define the relationship between gear stage, engine rotational speed, and the first variation limiting value, and the second variation limiting value, and referring to the first variation limiting value map, the second variation limiting value map at the time of control using the gear stage and the engine rotational speed in real time.

In a lower gear stage and with a higher rotation (area), a rotational difference (gap) at the time of gear shift increases. For this reason, the predetermined time map is defined such that the above-mentioned predetermined time (delay time) is longer in a lower gear stage and with a higher rotation (area). In addition, the predetermined time map is defined such that the above-mentioned predetermined time is shorter in a higher gear stage and with a higher rotation. Consequently, the time until limitation on the variation in engine rotational speed is relaxed (the time until the second variation limiting value is applied) is longer in a lower gear stage and with a higher rotation, and the time until limitation on the variation is relaxed is shorter in a higher gear stage and with a higher rotation.

Similarly, the first variation limiting value map and the second variation limiting value map are defined such that the above-mentioned first variation limiting value and second variation limiting value are smaller in a lower gear stage and with a higher rotation (area). In addition, the first variation limiting value map and the second variation limiting value map are defined such that the above-mentioned first variation limiting value and second variation limiting value are larger in a higher gear stage and with a higher rotation (area). Consequently, in a lower gear stage and with a higher rotation, the limiting values become smaller, that is, the rate of variation in rotational speed for display becomes lower, whereas in a higher gear stage and with a higher rotation, the limiting values become larger, that is, the rate of variation in rotational speed for display becomes higher.

The rotational speed for display, which has undergone the limiting processing performed by the rotational speed for display limiting module 45, is outputted to the MCU 70 via the CAN 100. As described above, the MCU 70 decodes CAN data (information on rotational speed for display) received from the TCU 40, and drives the stepping motor of the tachometer 81 included in the combination meter 80 so as to form a needle angle (rotational speed display) corresponding to the rotational speed for display.

Figure 3:
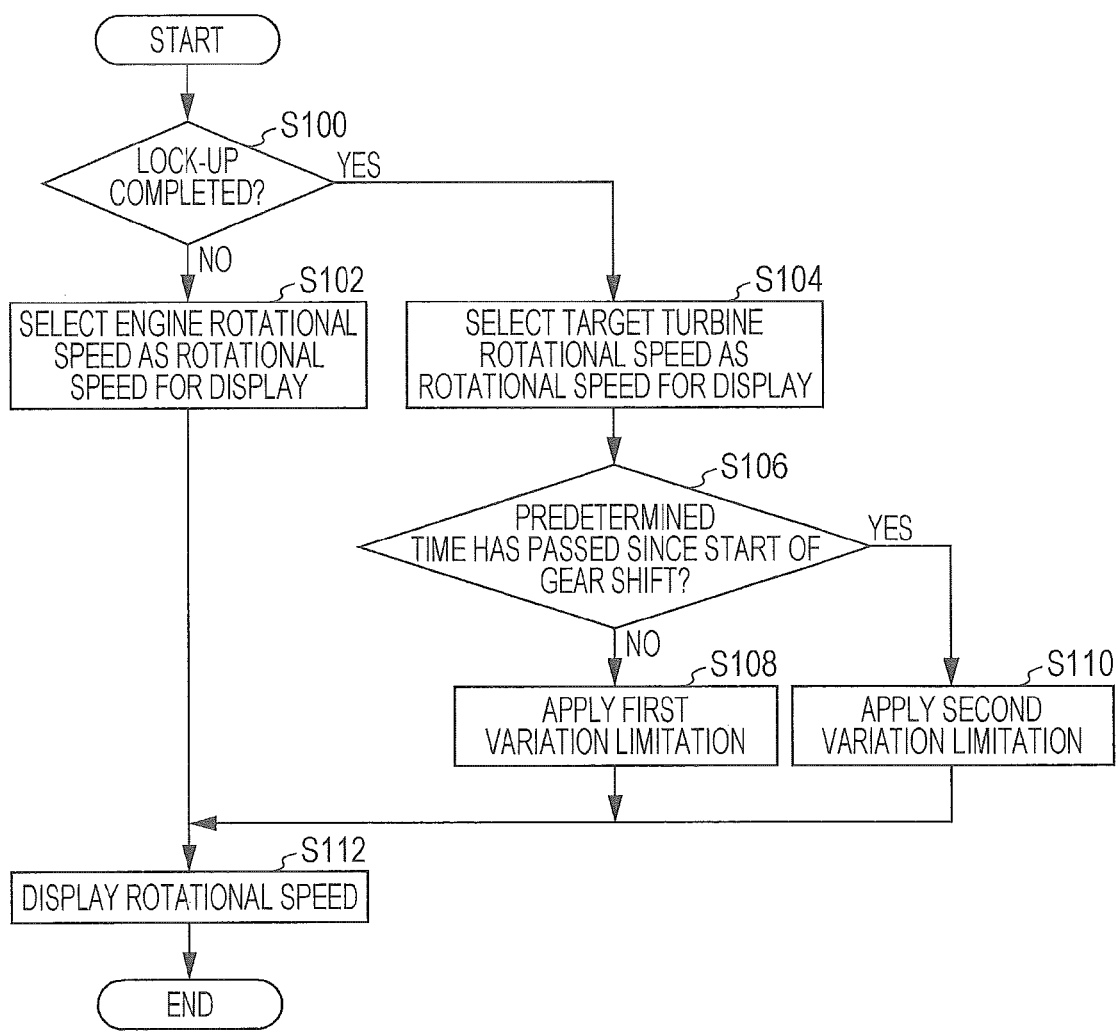
FIG. 3 is a flow chart illustrating the steps of engine rotational speed display processing performed by the engine rotational speed display device according to the implementation.

Next, the operation of the engine rotational speed display device 1 will be described with reference to FIG. 3. FIG. 3 is a flow chart illustrating the steps of engine rotational speed display processing performed by the engine rotational speed display device 1. This processing is repeated at predetermined intervals mainly in the TCU 40 and the MCU 70 when power mode and manual transmission mode are selected.

In step S100, it is determined whether or not engagement of the lock-up clutch 24 is completed. When the engagement of the lock-up clutch 24 is completed, the processing flow proceeds to step S104. On the other hand, when the engagement of the lock-up clutch 24 is not completed, the processing flow proceeds to step S102.

In step S102, the engine rotational speed is selected as the rotational speed for display. Subsequently, the processing flow proceeds to step S112. It is to be noted that when the engine rotational speed is used as the rotational speed for display, variation limitation (for example, setting of a maximum) may also be applied.

In step S104, the target turbine rotational speed is selected as the rotational speed for display. Subsequently, the processing flow proceeds to step S106. In step S106, it is determined whether or not a predetermined time has elapsed since a gear shift operation is received. When the predetermined time has not elapsed since the gear shift operation is received, the processing flow proceeds to step S108. On the other hand, when the predetermined time has elapsed since the gear shift operation is received, the processing flow proceeds to step S110.

In step S108, the variation in rotational speed for display per unit of time is limited so as not to exceed the first variation limiting value, and the rotational speed for display, which has undergone the limitation, is calculated (see the below-described time interval t1 to t2 in FIG. 4). Subsequently, the processing flow proceeds to step S112.

On the other hand, in step S110, the variation in rotational speed for display per unit of time is limited so as not to exceed the second variation limiting value, and the rotational speed for display, which has undergone the limitation, is calculated (see the below-described time interval after t2 in FIG. 4). Subsequently, the processing flow proceeds to step S112.

In step S112, the needle of the tachometer 81 is driven to display a rotational speed according to the rotational speed for display that is set in step S102, step S108, or step S110 described above. Subsequently, the processing is once aborted. The processing is again restarted from step S100 after a predetermined elapse of time.

Figure 4:
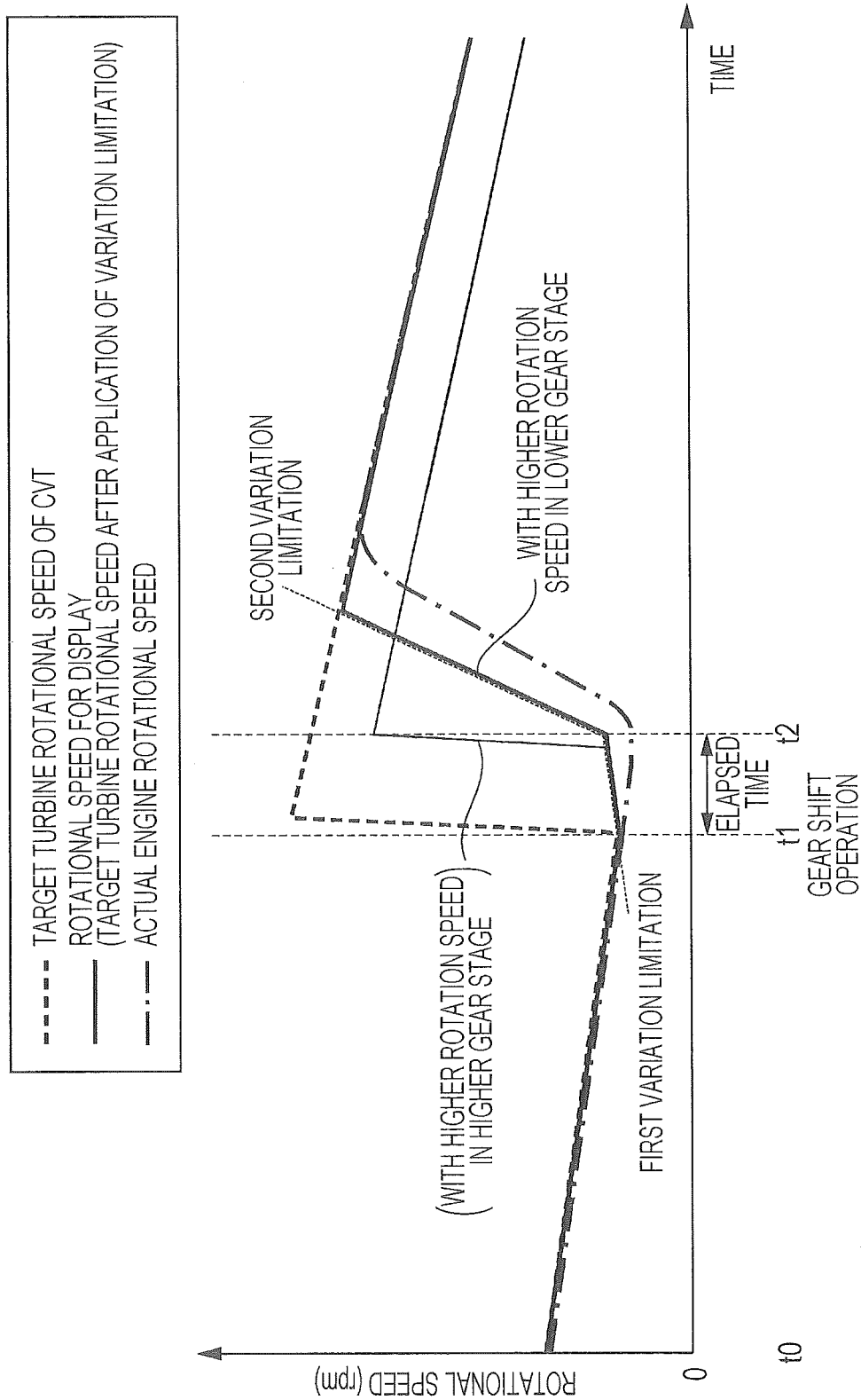
FIG. 4 is a timing chart illustrating an example of variation in rotational speed for display, actual engine rotational speed, and target turbine rotational speed when a gear shift operation is performed.

FIG. 4 illustrates an example of variation (timing chart) in the rotational speed for display, actual engine rotational speed, and target turbine rotational speed when the processing is performed according to the above-described flow chart. Here, the horizontal axis of FIG. 4 indicates time and the vertical axis thereof indicates rotational speed (rpm). In FIG. 4, the rotational speed for display is indicated by a solid line, actual engine rotational speed is indicated by an alternate long and short dashed line, and the target turbine rotational speed is indicated by a dashed line. The following description will be given under the assumption that power mode and manual transmission mode are selected and the lock-up clutch 24 is in an engaged state (that is, the target turbine rotational speed is selected as the rotational speed for display).

First, when a gear shift operation is received at time t1, the variation in rotational speed for display per unit of time is limited according to the first variation limiting value until the predetermined time elapses (between time t1 and t2) since the gear shift operation is received. Subsequently, the variation in rotational speed for display per unit of time is limited according to the second variation limiting value after time t2 (after the predetermined time elapses since the gear shift operation is received).

As a result, the rotational speed for display increases slightly earlier than the rising timing of the actual engine rotational speed with an angle (slope) slightly steeper than the rising angle of the actual engine rotational speed. That is, at the time of gear shift operation in manual transmission mode, the needle of the tachometer 81 is driven with a good response without giving sense of incongruity to a driver, the sense of incongruity being caused by a difference between the rotational speed displayed on the tachometer 81 and physical feeling (actual engine rotational speed). It is to be noted that in FIG. 4, the variation in rotational speed for display at the time of higher gear stage and higher rotation is also illustrated by a thin solid line. At the time of higher gear stage and higher rotation, the rising timing occurs earlier and the rising angle becomes steeper compared with the time of lower gear stage and higher rotation (thick solid line).

As described in detail so far, according to the present implementation, when the lock-up clutch 24 is engaged, the target turbine rotational speed is selected as the rotational speed for display. Here, since the target turbine rotational speed is a calculated value, unlike the actual engine rotational speed, no response delay occurs even at the time of gear shift operation, for example. Also, the engine rotational speed converges to the target turbine rotational speed when a gear shift operation is completed, and thus the variation in the engine rotational speed may be displayed earlier than the actual engine rotational speed varies. On the other hand, when the lock-up clutch 24 is not engaged, the actual engine rotational speed is selected as the rotational speed for display. Thus, for example even when slip rotation in the torque converter 20 changes (the rotational difference between the engine rotational speed and the turbine rotational speed changes) at the time of gear shift operation, its effect on the rotational speed for display may be prevented. Thus, sense of incongruity is not given to the driver. Also, when the lock-up clutch 24 is in an engaged state, the engine rotational speed and the turbine rotational speed have the same rotational speed (the rotational difference is zero), and thus even when the rotational speed for display is switched to the target turbine rotational speed, rotational speed display may be continued without giving sense of incongruity. As a result, it is possible to display a rotational speed so as to give more sporty impression to a driver without giving sense of incongruity.

According to the present implementation, it is possible to limit the variation in the rotational speed for display when the target turbine rotational speed is selected as the rotational speed for display. Thus, for example, at the time of gear shift operation, the variation in the rotational speed for display is reduced, thereby making it possible to make adjustment so as to prevent the rotational speed for display from significantly deviating from the actual engine rotational speed. Thus, it is possible to reliably prevent sense of incongruity from being given to a driver while giving sporty impression to the driver.

Particularly, according to the present implementation, a delay in transmission response (that is, delay in response of the engine rotational speed) at the time of gear shift operation in manual transmission mode is taken into consideration, and limitation may be applied to the variation in the rotational speed for display. Thus, deviation from the actual engine rotational speed, which is physically felt by a driver, for example, through a change in sound, is not significantly increased, and it is possible to display the rotational speed with an improved response in a range without giving sense of incongruity to a driver.

More specifically, according to the present implementation, the variation in the rotational speed for display is limited in two stages according to an elapsed time since a gear shift operation is performed. In addition, the first variation limiting value is set to be smaller than the second variation limiting value (that is, the variation is more reduced), the first variation limiting value being applied until the predetermined time elapses, the second variation limiting value being applied after the predetermined time elapses. Thus, by appropriately setting the first variation limiting value, start timing for variation in the rotational speed for display may be accurately matched with a delay in transmission response (delay in response of engine rotational speed) after a gear shift operation is performed. In addition, by appropriately setting the second variation limiting value, rotational speed display during a gear shift operation may be made with better responsiveness. Consequently, at the time of gear shift operation in manual transmission mode, deviation from the actual engine rotational speed, which is physically felt by a driver, is not significantly increased, and it is possible to improve response of rotational speed display without giving sense of incongruity to a driver.

Particularly, according to the present implementation, the above-mentioned predetermined time (delay time) is set to be longer in a lower gear stage and with a higher rotation (area). That is, the time until limitation on the variation is relaxed (the time until the second variation limiting value is applied) may be adjusted to be longer. Therefore, it is possible to reliably prevent sense of incongruity from being given to a driver.

Similarly, according to the present implementation, in a lower gear stage and with a higher rotation, the above-mentioned first variation limiting value and second variation limiting value are each set to a small value (that is, the rate of variation in rotational speed for display is adjusted to be lower). Consequently, it is possible to improve response of rotational speed display while reliably preventing sense of incongruity from being given to a driver.

Although the implementation of the present disclosure has been described above, the present disclosure is not limited to the above-described implementation and various modifications are possible. For example, in the above-described implementation, the variation limiting value on the rotational speed for display is changed in two stages according to an elapsed time since a gear shift operation is performed. However, without being limited to the two stages, the variation limiting value may be changed, for example, in three stages or more. The variation limiting value may not be changed in two stages, but a certain period of delay may be provided after a gear shift operation is performed and then the variation in the rotational speed for display may be limited according to a variation limiting value in a single stage.

In the above-described implementation, the present disclosure has been applied to a chain-type continuously variable transmission (CVT). However, instead of a chain-type continuously variable transmission, the present disclosure may be applied to, for example, a belt-type continuously variable transmission or a toroidal-type continuously variable transmission.

In the above-described implementation, the output characteristic of the engine 10 is switchable between three stages. However, the output characteristic of the engine 10 is not necessarily need to be selectable.

Furthermore, in the above-described implementation, a needle type (analog type) tachometer 81 has been used. However, the present disclosure is also applicable to, for example, a digital display tachometer.

It is to be noted that when the lock-up clutch is engaged (at the time of lock-up), the turbine rotational speed is the same as the engine rotational speed, and thus the target turbine rotational speed is synonymous with the target engine rotational speed. Also when the gear ratio (a gear ratio of a reduction gear, as an example) between the torque converter and the primary pulley included in the continuously variable transmission is taken into consideration, the target turbine rotational speed is also synonymous with the target primary pulley rotational speed.

The invention claimed is:

1. An engine rotational speed display device for a vehicle equipped with a continuously variable transmission that includes a manual transmission mode and that converts and outputs a drive force that is outputted from an engine and transmitted via a torque converter with a lock-up clutch, the manual transmission mode allowing a gear shift according to a gear shift operation of a driver, the engine rotational speed display device comprising:
    an engagement state determination module that determines an engagement state of the lock-up clutch;
    an engine rotational speed acquisition module that acquires a rotational speed of the engine;
    a target rotational speed setting module that sets a target turbine rotational speed of a turbine liner included in the torque converter according to a selected gear stage;
    a rotational speed for a display selection module that selects the engine rotational speed as a rotational speed for display when the lock-up clutch is not engaged and selects the target turbine rotational speed as the rotational speed for display when the lock-up clutch is engaged;
    a display unit that displays a rotational speed according to the rotational speed for display; and
    wherein the rotational speed for display is limited such that a variation in the rotational speed for display per unit of time falls within different variation limiting values based on a comparison between a predetermined time and an elapsed time since the gear shift operation is received.

2. The engine rotational speed display device according to claim 1, further comprising:
    a limiting module that limits a variation in the rotational speed for display when the target turbine rotational speed is selected as the rotational speed for display by the rotational speed for the display selection module,
    wherein the display unit displays the rotational speed according to the rotational speed for display for which the variation is limited by the limiting module.

3. The engine rotational speed display device according to claim 2, further comprising:
    an operation unit that receives the gear shift operation by the driver in the manual transmission mode; and
    a time measuring module that measures an elapsed time since the gear shift operation is received by the operation unit,
    wherein the limiting module limits the variation in the rotational speed for display per unit of time according to the elapsed time measured by the time measuring module.

4. The engine rotational speed display device according to claim 3, wherein the limiting module limits the rotational speed for display so that the variation in the rotational speed for display per unit of time falls within a first variation limiting value until the elapsed time exceeds a predetermined time, and the limiting module limits the rotational speed for display so that the variation in the rotational speed for display per unit of time falls within a second variation limiting value after the elapsed time exceeds the predetermined time, and
    wherein the first variation limiting value is set to be smaller than the second variation limiting value.

5. The engine rotational speed display device according to claim 4, wherein the predetermined time is variably set based on the gear stage selected by the gear shift operation and/or the engine rotational speed.

6. The engine rotational speed display device according to claim 4, wherein the first variation limiting value and the second variation limiting value are each variably set based on the gear stage selected by the gear shift operation and/or the engine rotational speed.

7. The engine rotational speed display device according to claim 5, wherein the first variation limiting value and the second variation limiting value are each variably set based on the gear stage selected by the gear shift operation and/or the engine rotational speed.

8. The engine rotational speed display device according to claim 1, further comprising:
    an operation unit that receives the gear shift operation by the driver in the manual transmission mode; and
    a time measuring module that measures the elapsed time since the gear shift operation is received by the operation unit.

9. The engine rotational speed display device according to claim 8, further comprising:
    a limiting module that limits the variation in the rotational speed for display when the target turbine rotational speed is selected as the rotational speed for display by the rotational speed for the display selection module.

10. The engine rotational speed display device according to claim 9, wherein the limiting module limits the variation in the rotational speed for display per unit of time according to the elapsed time measured by the time measuring module.

11. The engine rotational speed display device according to claim 10, wherein the limiting module limits the rotational speed for display so that the variation in the rotational speed for display per unit of time falls within a first variation limiting value of the variation limiting values until the elapsed time exceeds the predetermined time, and the limiting module limits the rotational speed for display so that the variation in the rotational speed for display per unit of time falls within a second variation limiting value of the variation limiting values after the elapsed time exceeds the predetermined time.

12. The engine rotational speed display device according to claim 11, wherein the first variation limiting value is set to be different from the second variation limiting value.

13. The engine rotational speed display device according to claim 3, wherein the limiting module limits the rotational speed for display so that the variation in the rotational speed for display per unit of time falls within a first variation limiting value of the variation limiting values until the elapsed time exceeds the predetermined time, and the limiting module limits the rotational speed for display so that the variation in the rotational speed for display per unit of time falls within a second variation limiting value of the variation limiting values after the elapsed time exceeds the predetermined time.

14. The engine rotational speed display device according to claim 13, wherein the first variation limiting value is set to be different from the second variation limiting value.

* * * * *